United States Patent [19]

Larsson

[11] Patent Number: 4,581,047
[45] Date of Patent: Apr. 8, 1986

[54] COMPRESSED AIR DRIER

[75] Inventor: Sven-Olof Larsson, Landskrona, Sweden

[73] Assignee: SAB Automotive AB, Landskrona, Sweden

[21] Appl. No.: 719,818

[22] Filed: Apr. 4, 1985

[30] Foreign Application Priority Data

Apr. 19, 1984 [SE] Sweden ............................. 8402216

[51] Int. Cl.⁴ ............................................. B01D 53/26
[52] U.S. Cl. ......................................... 55/179; 34/80; 55/387
[58] Field of Search .................... 55/387, 512, 179; 34/80

[56] References Cited

U.S. PATENT DOCUMENTS

| 2,204,431 | 6/1940 | Moore et al. | 55/387 |
| 2,790,512 | 4/1957 | Dow |  |
| 3,201,921 | 8/1965 | Heyes | 55/179 |
| 3,399,514 | 9/1968 | Reid | 55/387 |
| 4,058,380 | 11/1977 | King, II | 55/387 |
| 4,487,617 | 12/1984 | Dienes et al. | 55/387 |

FOREIGN PATENT DOCUMENTS 0053850 2/1985 European Pat. Off. .
2050195 8/1982 United Kingdom .

Primary Examiner—Larry I. Schwartz
Attorney, Agent, or Firm—Laurence R. Brown

[57] ABSTRACT

A drying tower for a compressed air drier includes a base (5) and a reservoir (4) containing a cartridge (8) filled with filter material (12) and desiccant (11).

In order to obtain an optimal utilization of the desiccant and of the space the cartridge (8) completely fills the reservoir (4) and is provided with two longitudinal partition walls (13, 14) perpendicular to each other and having two openings (15) at the end remote from the base, so that—aided by suitable shaping of the base—the air will be transported in a winding path consecutively through all four desiccant-filled compartments formed by the walls.

1 Claim, 6 Drawing Figures

COMPRESSED AIR DRIER

TECHNICAL FIELD

This invention relates to a device at a drying tower for a compressed air drier including a base with an inlet and an outlet for compressed air and with a reservoir containing a cartridge, which is filled with filter material and desiccant and which is provided with inner partition walls for accomplishing a winding path for the compressed air through the cartridge.

BACKGROUND OF THE INVENTION

Compressed air driers of the kind set out above are well known in the art and may be used for drying (and cleaning) compressed air in vehicles or in stationary systems, the former application being of most interest in the present case.

The basic design and function of the air drier forming the basis for the present invention are shown in the British Pat. No. 2 050 195 and in the European Patent Application No. 81201271.4.

The use of a cartridge, filled with filter material and dessicant, in the reservoir forming part of the drying tower of the air drier is also known.

Furthermore, it is known (see for example U.S. Pat. No. 2,790,512) that it is advantageous for utilizing the drying function of the dessicant to have a long and comparatively narrow path for the air through the desiccant rather than a short and wide path. In FIG. 5 of said U.S. Pat. No. 2,790,512 the possibility of obtaining the desired long path within a comparatively low tower by accomplishing a winding path for the air is suggested.

THE INVENTION

The primary purpose of the invention is to accomplish an air drier of the kind set out above making optimal use of the advantages with the cartridge and the winding path for the air within a reservoir with minimal outer dimensions.

This is according to the invention attained in that the cartridge has the same outer shape and dimensions as the inner shape and dimensions of the reservoir and in that—by the provision in the cartridge of two longitudinal partition walls perpendicular to each other with two openings at the end remote from the base and by the provision in the base of two corresponding walls—the compressed air will be transported consecutively through all four desiccant-filled cartridge compartments formed by the walls.

BRIEF DESCRIPTION OF THE DRAWINGS

The invention will be described in further detail below reference being made to the accompanying drawings, in which FIG. 5 is a section along the line V—V in FIG. 4, and FIG. 6 is a section (along the line VI—VI in FIG. 5) perpendicular to that in FIG. 4.

DESCRIPTION OF A PREFERRED EMBODIMENT

Figure 1:
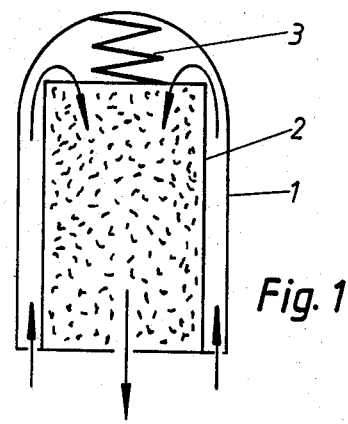
FIGS. 1 and 2 are schematic sections through prior art air driers.

As already stated above it is known to insert a cartridge containing desiccant for absorbing moisture from compressed air and possibly filter material for removing contaminants in a drying tower. An example thereof is shown in FIG. 1.

In a reservoir 1 a desiccant-filled cartridge 2 is centrally located, and a spring 3 holds the cartridge against its base (not shown). The air to be dried is passed upwards past the cartridge 2 and then down through the desiccant therein. The air only passes once through the desiccant, the path being short and wide. The poor utilization of the space within the reservoir 1 is to be noted.

Figure 2:
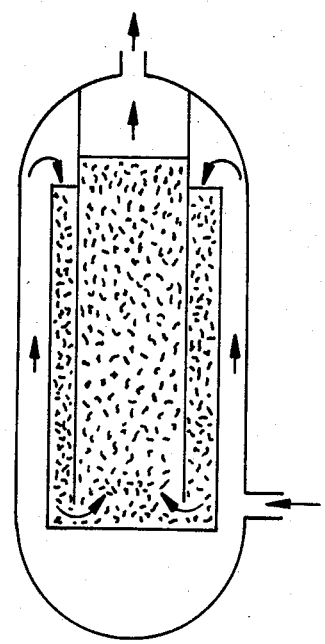
Figure 5:
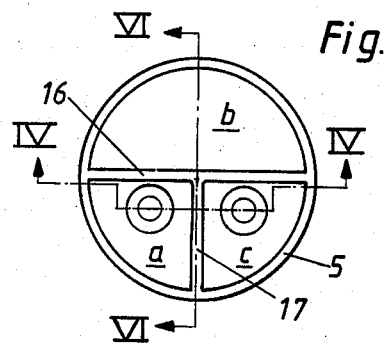

In FIG. 2 (which corresponds to FIG. 5 from U.S. Pat. No. 2,790,512) the provision of a winding path for the air through the desiccant is depicted, but also in this case the space within the reservoir is poorly utilized.

Figure 3:
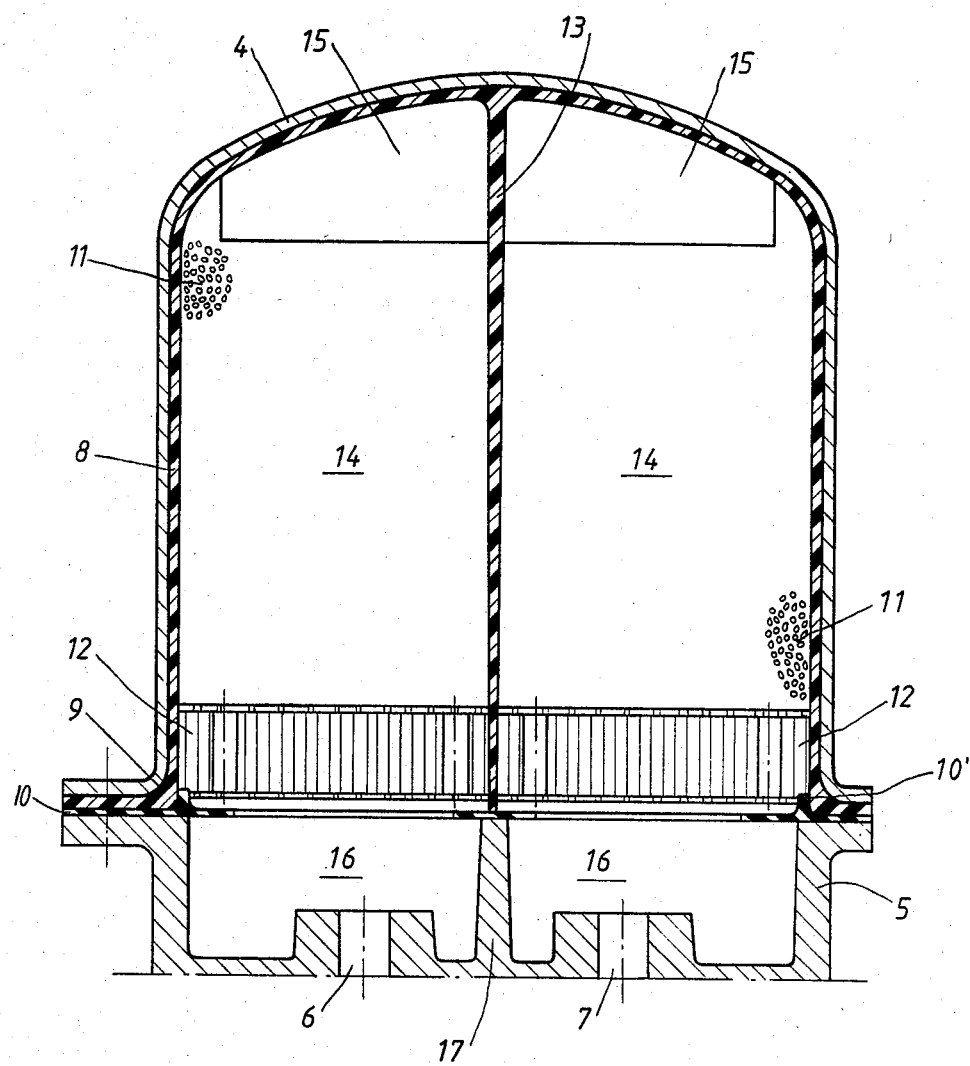
FIG. 3 is a section through a drying tower including its base according to the invention.

A drying tower according to the invention is shown in FIG. 3. This tower is preferably to be used for a so called two tower drier, where the air to be dried is passed through one tower, while a fraction of the dried air is passed through the second tower for drying the desiccant therein earlier moistened at its foregoing air drying cycle, and vice versa. For this function a control and valve system is needed; this system is not shown herein, as it is regarded as state of the art (see for example European Patent Application No. 81201271.4).

A metal reservoir 4 is attached to a base 5 having an inlet 6 and an outlet 7 for compressed air. A cartridge 8 (preferably of a plastic material) with the same outer shape and dimensions as the inner shape and dimensions of the reservoir 4 is inserted therein and is clamped between the reservoir 4 and the base 5, a sealing ring 9 being provided against the reservoir 4. A sealing 10 below the cartridge 8 is clamped between the latter and the base 5.

The cartridge 8 is completely filled with desiccant 11 and filter 12 (comprising two perforated plates, polyester filter material, and spacers). A certain compressing effect on the contents of the cartridge 8 is obtained by a resilient annular bead 10' on the sealing 10. The cartridge 8 with its contents and the sealing 10 (held in position by undercuts) is delivered as a replacement unit to a customer, and the cartridge 8 can also be seen as a packing for storage and transport.

Integrally formed in the cartridge 8 are two longitudinal partition walls 13 and 14, which are perpendicular to each other and thus form a cross as viewed from the lower, free end of the cartridge. The first wall 13 is completely unbroken, whereas the second wall 14 at its upper end has an opening 15 at either side of the wall 13 for allowing air to pass, as will be described below.

Also the base 5 has two partition walls, one wall 16 forming a continuation of the cartridge wall 14 and dividing the space within the base in two halves (as can be seen in FIG. 5) and one shorter wall 17 forming a continuation of half the cartridge wall 13 and lying between the inlet 6 and the outlet 7.

Figure 4:
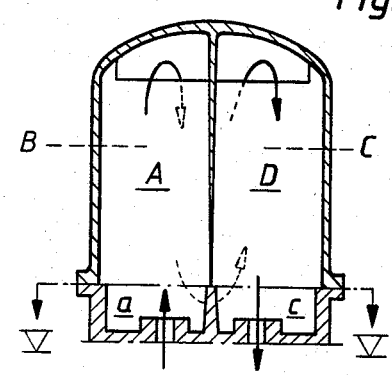
FIGS. 4–6 are simplified illustrations to a smaller scale aiming at elucidating the function of the drying tower, wherein FIG. 4 corresponds to FIG. 3.
Figure 6:
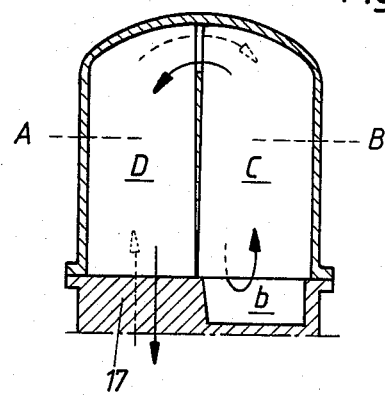

The shown and described design of the cartridge and the base has the effect that the air flow will be as follows, reference now primarily being made to FIGS. 4–6.

From inlet base compartment a the air will flow upwards through cartridge compartment A and down through cartridge compartment B to base compartment b, further up through cartridge compartment C and down through cartridge compartment D to outlet base compartment c. It is obvious that the air flow path through the desiccant 11 has a four times greater length than the height of the reservoir 4 but also that the air will pass filter material 12 four times for accomplishing cleaner and drier air than in any known competing design.

I claim:

1. A compressed air drier comprising a base (5) having an inlet (6) and an outlet (7) for compressed air, a reservoir (4) containing a cartridge (8) filled with filter material (12) and desiccant (11), two inner partition walls (13, 14) in said cartridge defining a winding path for the compressed air through the cartridge characterized in that said cartridge (8) has the same outer shape and dimensions as the inner shape and dimensions of said reservoir (4) and that said two partition walls (13, 14) extend across the width of the cartridge and are longitudinally oriented defining an X-shaped cross-section and extend from said base to proximate the top of said reservoir, providing two openings (15) at the end remote from the base (5), said openings being located on opposite sides of the intersection between said two partition walls, said base (5) having two corresponding walls (16, 17) coplanar with the partition walls in the cartridge and in communication with the inlet and outlet so that the compressed air will be transported consecutively through all four desiccant-filled cartridge compartments formed by the walls.

* * * * *